Figure 5:
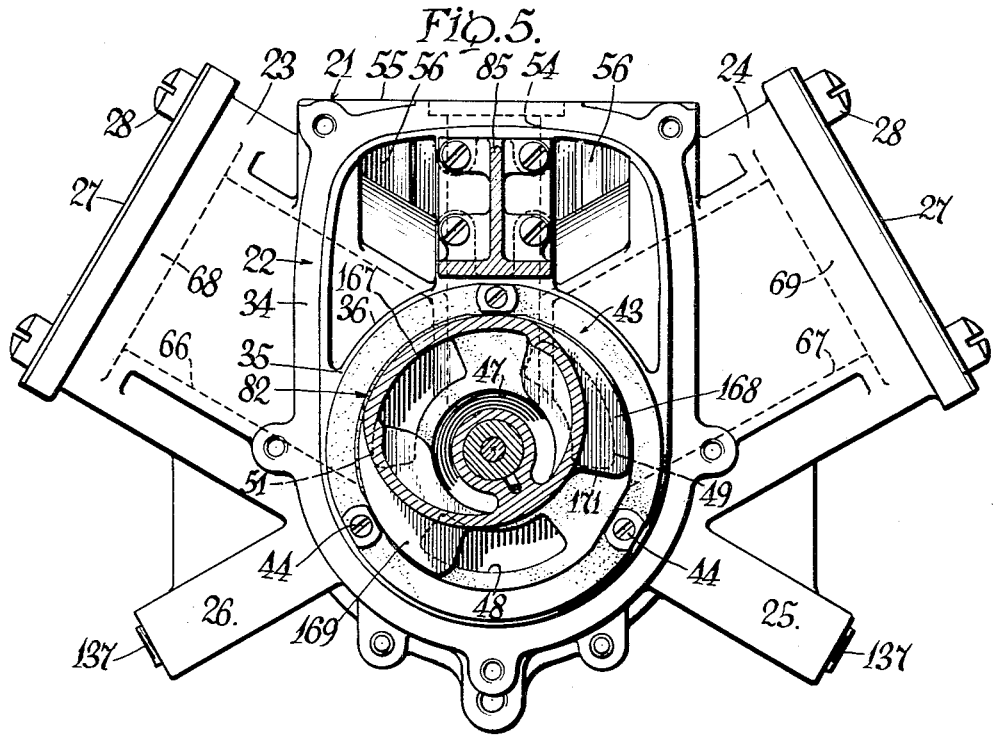

April 10, 1956     F. H. AINSWORTH     2,741,131
ADJUSTABLE STROKE MECHANICAL MOVEMENT
Filed Aug. 29, 1951     5 Sheets-Sheet 1
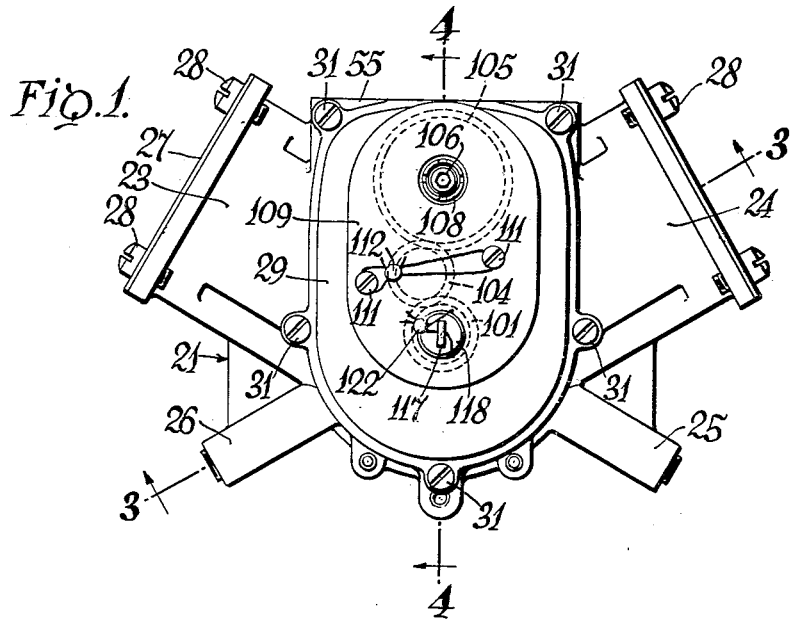
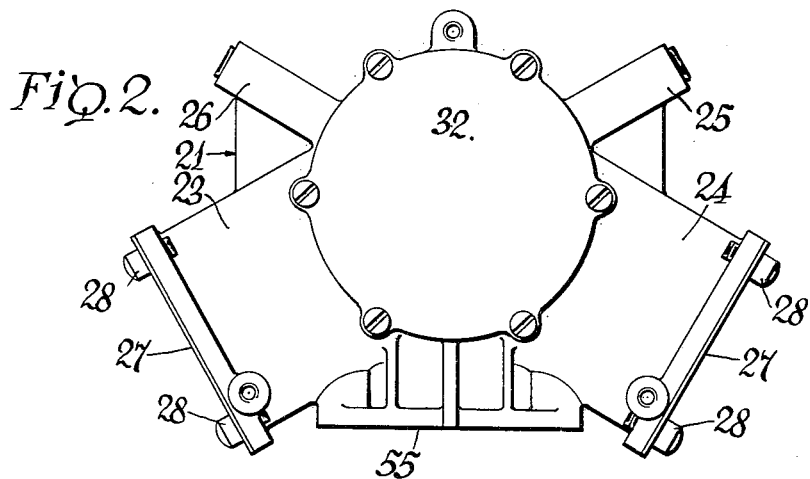
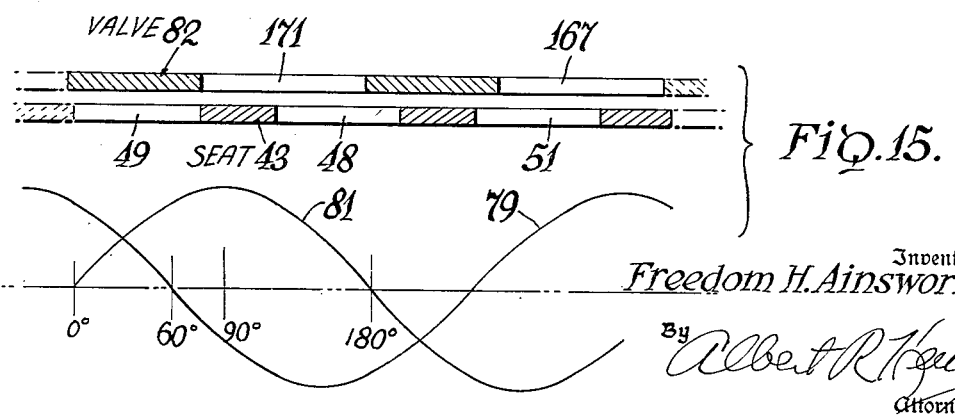
Inventor
*Freedom H. Ainsworth,*
By Albert R. Kray
Attorney April 10, 1956 F. H. AINSWORTH 2,741,131
ADJUSTABLE STROKE MECHANICAL MOVEMENT
Filed Aug. 29, 1951 5 Sheets-Sheet 2
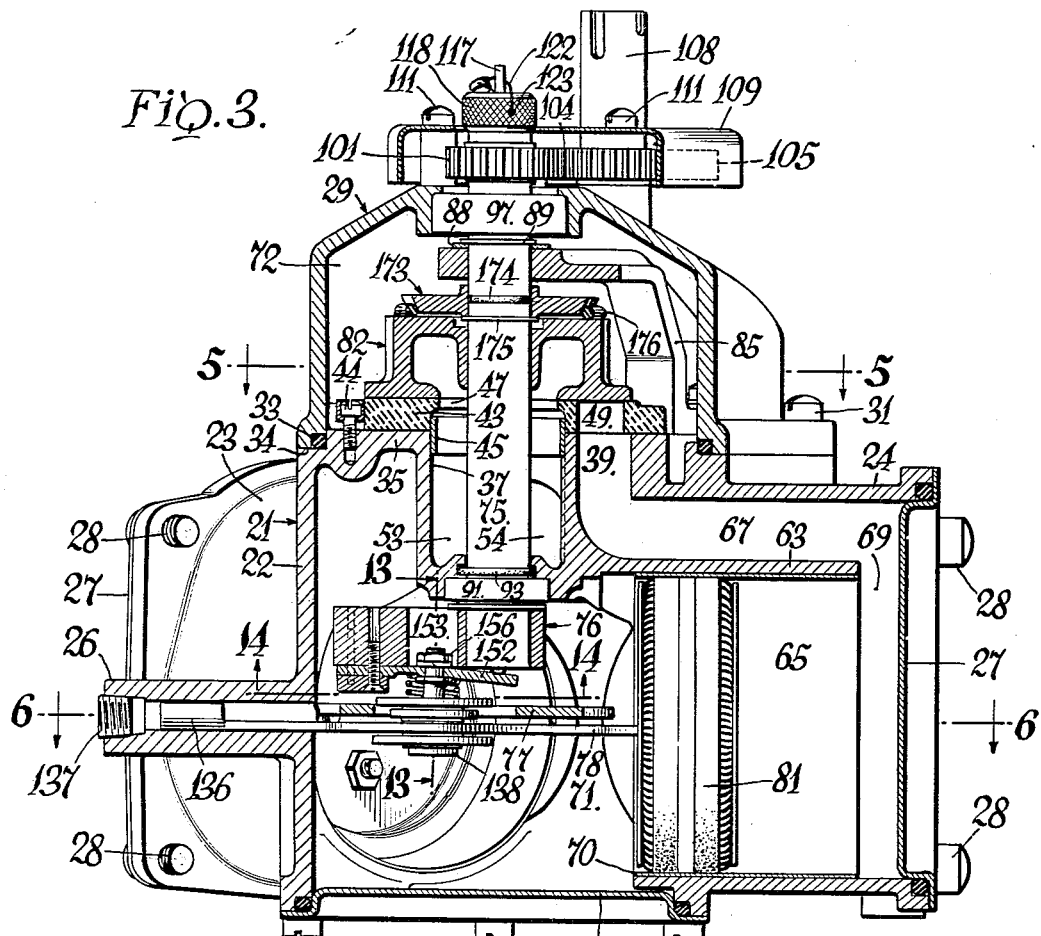
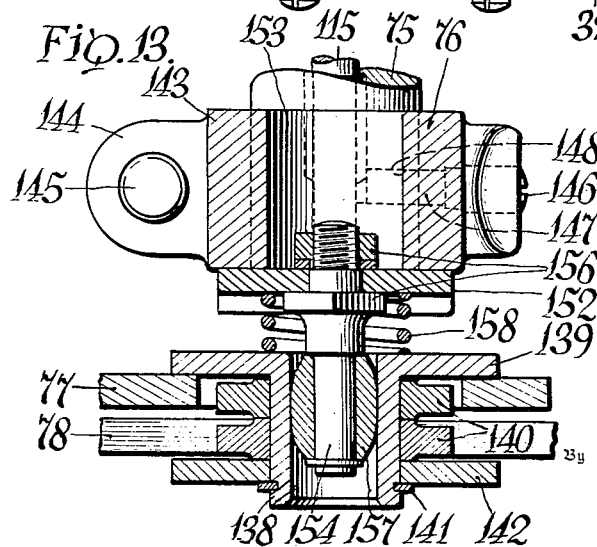
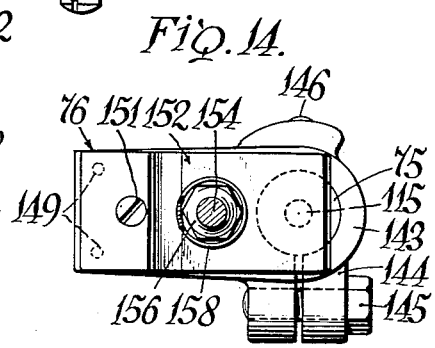
Inventor
Freedom H. Ainsworth,
Attorney

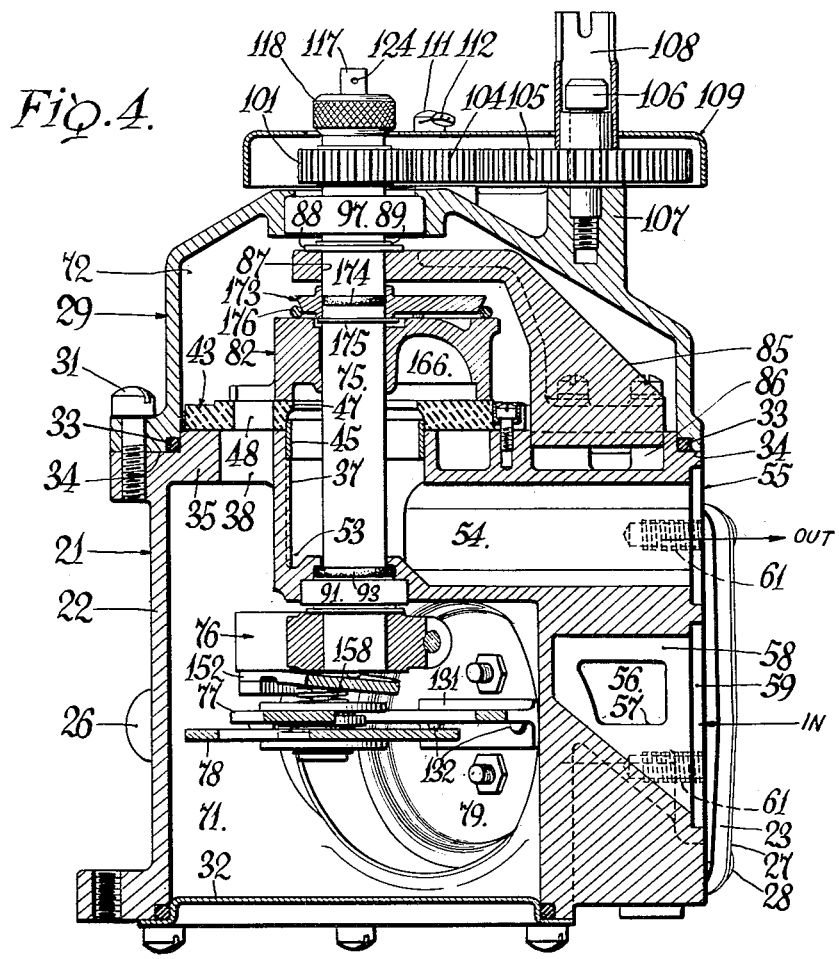
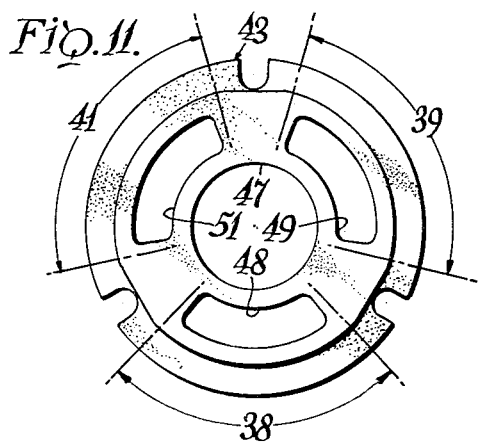
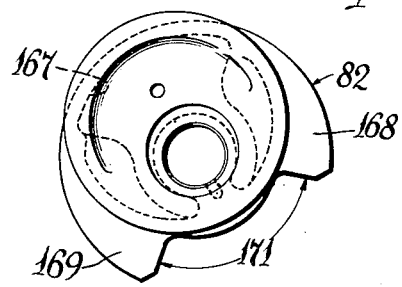

April 10, 1956 F. H. AINSWORTH 2,741,131
ADJUSTABLE STROKE MECHANICAL MOVEMENT
Filed Aug. 29, 1951 5 Sheets-Sheet 4

Inventor
Freedom H. Ainsworth,
By Albert R. Henry
Attorney

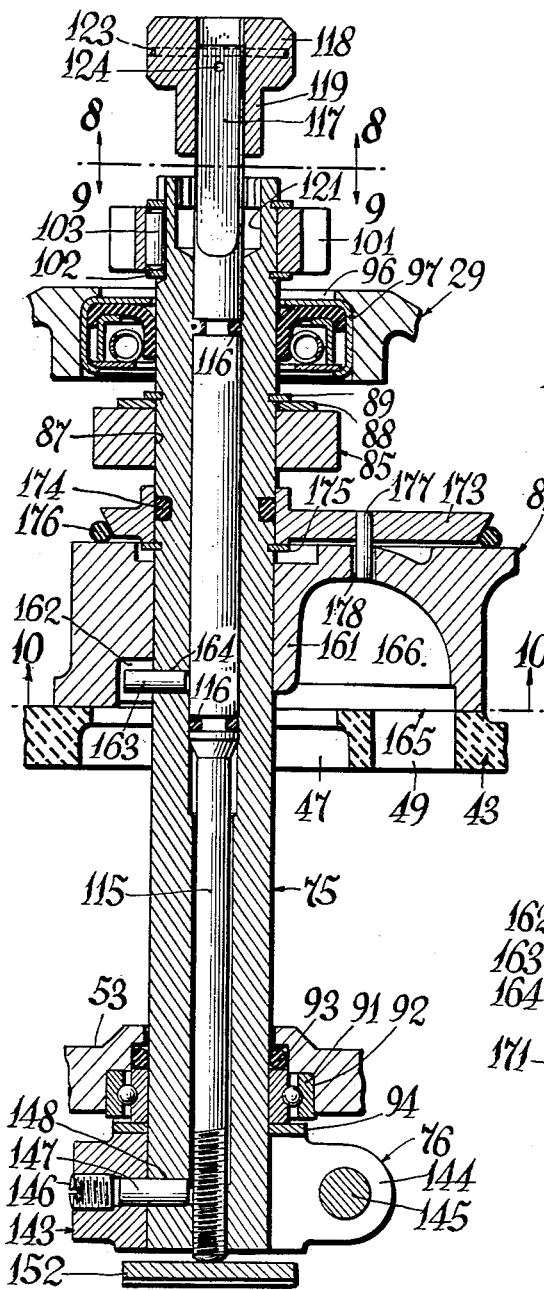
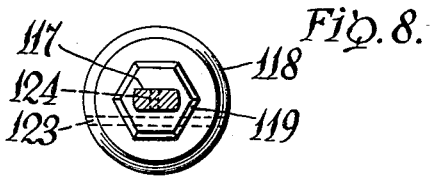
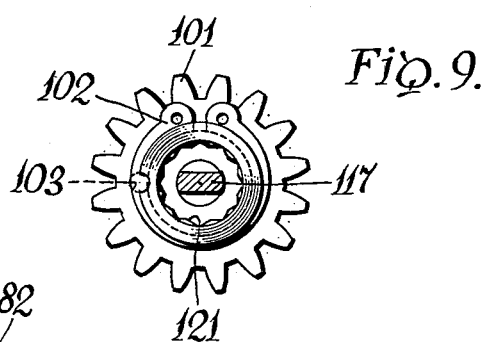
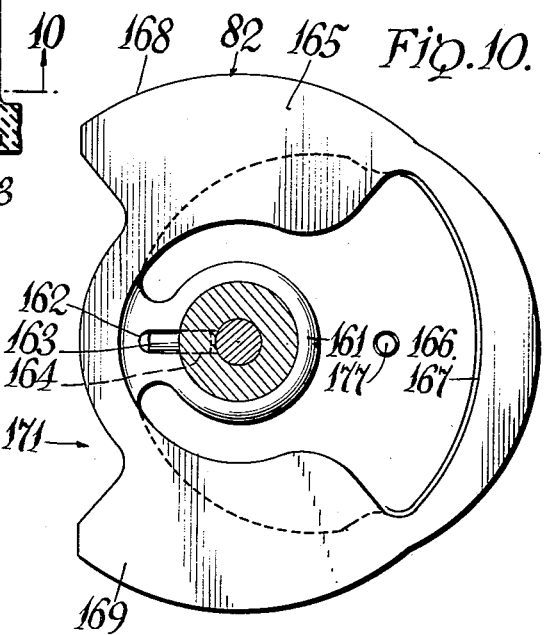

United States Patent Office 2,741,131
Patented Apr. 10, 1956

2,741,131

ADJUSTABLE STROKE MECHANICAL MOVEMENT

Freedom H. Ainsworth, Salisbury, Md., assignor to The Wayne Pump Company, Salisbury, Md., a corporation of Maryland Application August 29, 1951, Serial No. 244,210

3 Claims. (Cl. 74—50)

This invention relates to volumetric meters, and it has particular reference to the provision of an improved multiple piston meter having a high degree of accuracy over a relatively wide range of flow rates, thereby making it suitable for the measurement of liquids such as gasoline.

It is well understood that the customary gasoline dispensing pump, employed for retail sales of motor fuel, includes a volumetric meter through which the gasoline flows, to provide means for determining the quantity dispensed. The meter, in turn, is connected to a register which indicates the quantity in terms of gallons, price, or both. The mechanism of the register imposes a heavy load on the meter, tending to make operation erratic or aperiodic, and thus increase the probability of erroneous measurement. Variations in the flow rate, caused by opening and closing the dispensing nozzle, also contribute to inaccurate metering. Meters of this class must also be provided with regulating or calibrating means, which, in some designs, is not conveniently accessible for purposes of field adjustment. Other problems encountered in gasoline meters include smoothness of operation of the meter parts without impairing accuracy, minimization of pulsating discharge, and adaptability to manufacture with a minimum of expense.

The meter of the present invention presents a practical solution of these coexisting problems. In common with known meters, it comprises a multiple piston-in-cylinder hydraulic motor, wherein admission of liquid to the ends of the pistons causes reciprocation thereof, to effect the rotation of a shaft which is adapted to be connected to the register. A rotary valve, coupled to the shaft, admits liquid to the cylinders or permits flow to the outlet connection, in proper timed relation. As distinguished from known meters, such as the four cylinder cruciform type, or the two cylinder full double acting arrangement, the present meter incorporates the principle of limiting the number of actual cylinders, and maintaining desired capacity by providing what may be temed a "blind" or "hypothetical" piston and cylinder, mechanically and hydraulically cooperating with those which are structurally existent.

The result is obtained, in part, by so arranging the various ports and the valve that liquid is admitted sequentially to both the crankcase and head ends of the cylinders, in such manner that the volume admitted to, or withdrawn from, the crankcase, is equal to the algebraic sum of the volume withdrawn from, or admitted to, the head ends of the cylinders. Two pistons, actuated through the valve mechanism advantageously one hundred and twenty degrees out of phase, thus increase the work equivalent of three pistons. The utilization of this principle accordingly reduces the actual number of cylinders required for a given capacity, with the advantages of reduction of internal friction and pulsation, smoother operation, and also with attendant reduction in manufacturing costs.

Other features of the invention include a novel and sensitive vernier adjusting or calibrating means, and the provision of partial hydraulic balance which retains the valve element on its seat with a minimum of friction consistent with elimination of leakage. Additional features and advantages will be made clear as the description proceeds.

Figure 6:
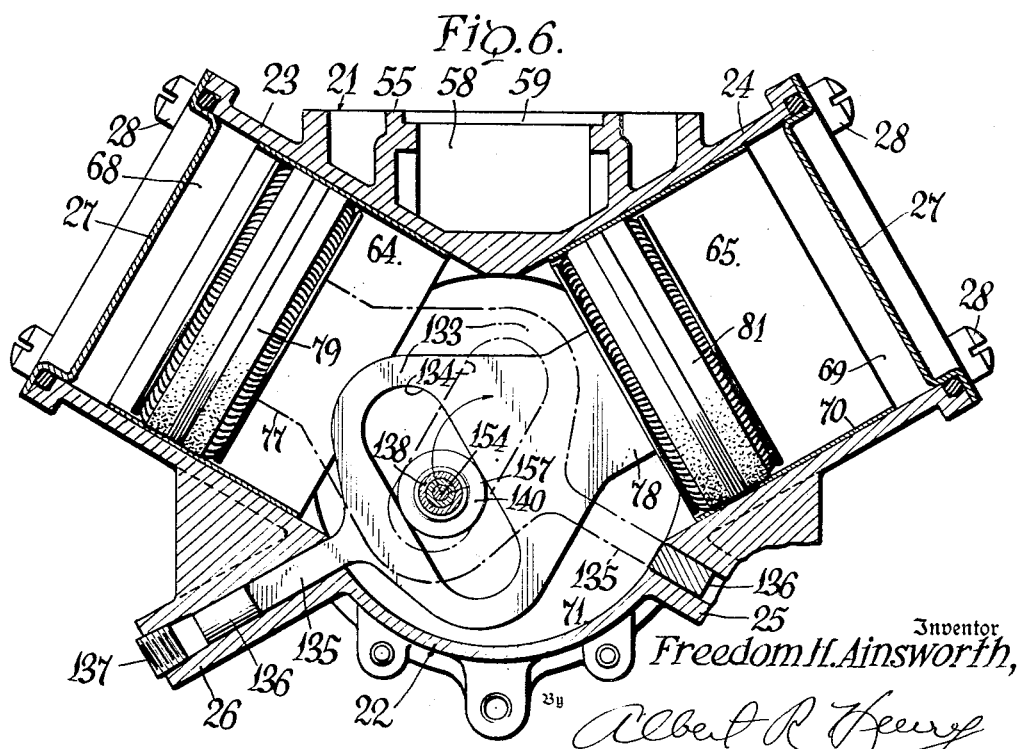

A preferred embodiment of the invention is shown in the accompanying drawing, wherein:

Fig. 1 is a top plan of the improved meter;
Fig. 2 is a bottom view;
Figs. 3 and 4 are enlarged vertical sections taken on the correspondingly numbered lines in Fig. 1;
Figs. 5 and 6 are horizontal sections taken substantially at the elevations indicated by the correspondingly numbered lines in Fig. 3;
Fig. 7 is an additionally enlarged section through the shaft assembly;
Figs. 8, 9, and 10 are views taken on the correspondingly numbered lines in Fig. 7;
Fig. 11 is a plan of the valve seat, with the positions of certain related ports indicated by broken lines;
Fig. 12 is a plan of the valve element;
Figs. 13 and 14 are enlarged views of the crank and piston rod assembly, taken substantially on the correspondingly numbered lines in Fig. 3; and
Fig. 15 is a motion diagram, illustrative of the operation of the meter.

Referring first to Figs. 1 to 4, the meter comprises a main body casting 21 having a crank case portion 22 and two cylinder portions 23 and 24, each extending from the crank case portion at an angle of sixty degrees to the median, and therefore including an angle of one hundred and twenty degrees. Also extending from the crank case at the same angle, but in the opposite direction, are guide barrels 25 and 26, which are accordingly aligned with the cylinders 23 and 24. The ends of the cylinder portions are capped by head plates 27, detachably secured by screws 28. The top of the crank case portion 22 is enclosed by a cover or dome 29, secured by screws 31, while the bottom of the crank case is sealed by a removable base plate 32.

Referring also to Fig. 5, together with Figs. 3 and 4, it will be seen that the top of the crank case portion 22 is provided with a finished marginal pad 34 constituting a seat for the dome 29, a sealing ring 33 being employed to form a fluid-tight joint. The marginal portion 34 merges into a top wall section, designated by the reference numeral 35. This wall comprises an annular section 36 formed with a central circular opening 37, and with three equiangularly spaced circumferential openings 38, 39, and 41. One of these is shown in Fig. 3 and another in Fig. 4—they do not appear in Fig. 5 because they are covered by a valve seat 43, which is positioned on the top of the wall 36 by screws 44, and a centering bushing 45 extending into the central opening 37. It will be seen from Fig. 5, and also from Fig. 11, that the valve seat 43 is an annular member, formed with a central opening 47, and with three arcuate openings 48, 49, and 51, respectively adapted to overlie the openings 37, 38, 39, and 41. All of these openings constitute ports, and the relation of the arcuate ports to each other is further shown by the superimposed dot and dash lines in Fig. 11.

The wall 35 is also formed with a depending cylindrical portion or well 53, and with a substantially cylindrical, horizontal, and radially disposed duct 54 which communicates at its inner end with the well 53, and which terminates in the end face 55 of the crankcase portion 22, as best shown in Figs. 4 and 5. The regions on either side of the duct 54 are cored to provide open spaces 56 in communication with the space within the dome 29 and above the wall 35. These spaces constitute riser ducts which are formed with laterally disposed ports 57 below the horizontal duct 54. The ports 57 are contiguous with a chamber 58 which is open to the end face 55 through a circular port 59.

The end face 55 is finished to provide a pad area for inlet and outlet fittings (not shown), which may be secured thereto by screws entering tapped holes 61 (see Fig. 4) positioned at suitable intervals around the margin of the face 55. The chamber 58, ports 57, and ducts 56 constitute the inlet to the meter, admitting the liquid to the space above the wall 35 for distribution in a manner presently to be explained. The cylinder 53 and duct 54 provide the outlet passage.

Each of the cylinder portions 23 and 24 is internally formed with a cylindrical wall 63, extending radially from the base of the well 53, in spaced relation to the top area of the cylinder portion, and merging into the side and bottom areas. The internal wall 63 is stopped short of the end cover 27, and there is thus provided, in each of the portions 23 and 24, a working cylinder 64 and 65 respectively, an overhead horizontal duct 66 and 67, and an end clearance gap 68 and 69 respectively. The working cylinders, which are fitted with liners 70, are open at their inner ends to the crankcase compartment 71 below the well 53, as will be readily apparent from Figs. 3, 4, and 6. The ducts 66 and 67 respectively merge, at their inner ends, into the arcuate ports 41 and 39 formed in the top wall section 36.

It will now be seen that when, through valving means hereinafter described, there is fluid communication between the space 72 beneath the dome 29, and the superimposed ports 48 and 38, liquid may flow from the inlet 59 into the crankcase 71, and thence into the inner ends of the working cylinders 64 and 65. Similarly, when fluid communication is established between the dome space 72 and the superimposed pairs of arcuate ports 51, 41, and 49, 39, liquid may flow through the ducts 66 and 67 respectively to the head ends of the cylinders 64 and 65. Conversely, when each of the several pairs of arcuate ports is closed to the space 72, and provided that the arcuate ports are placed in fluid communication with the superimposed circular ports 47 and 37, liquid may flow from the crankcase 71, or the head ends of the cylinders 64 and 65, through the well 53 and duct 54 to the discharge line.

The foregoing portion of the description has addressed itself primarily to fixed components of the meter, and consideration will now be given to the movable parts. As a brief introduction, it may be noted that a vertical shaft 75 extends from the outer top of the dome 29 to below the well 53. The lower end of the shaft is provided with a crank arm 76 which, through piston rods 77 and 78, is connected to pistons 79 and 81 respectively disposed in the cylinders 64 and 65. The shaft 75 also has secured to it a rotary valve element 82 which seats on the valve seat 43, and which governs admission or discharge of liquid to the cylinders and crankcase 71. The outer end of the shaft 75 is connected to gearing, hereinafter identified, by means of which rotation of the shaft is transmitted to a register. Thus, it will generally be understood that the pressure of incoming liquid, properly directed against the ends of the pistons 79 and 81, imparts rotation to the shaft 75, to enable the registering mechanism to reflect piston movement, and hence liquid volume.

The shaft 75, shown in section in Fig. 7, is journaled in a bearing bracket 85 which is supported in a recess 86 formed in the top wall 35 of the crankcase portion 22 above the duct 54, as is clearly shown in Fig. 4. The outer end of the bracket 85 is drilled and reamed to provide a radial sleeve bearing 87, over which is superimposed a thrust bearing washer 88, retained in position by a snap ring 89 which resiliently fits into a circumferential groove appropriately formed in the shaft 75. The lower end of the shaft is rotatably mounted in a ball bearing 91, positioned in a recess 92 formed in the bottom wall of the well 53 against an O-ring resilient seal 93, which prevents leakage between the well and the crankcase 71. The lower end of the shaft also carries a thrust washer 94 which abuts the crank arm 76. The upper end of the shaft 75 passes through an opening 96 formed in the top of the dome 29, where it is surrounded by a conventional "hat packing" or seal 97, to prevent leakage of liquid from the dome. The shaft extends, of course, through the central port 47 of the valve seat 43.

A gear 101 is secured to the outer end of the shaft 75 by spaced snap rings 102 and a cylindrical key 103. This gear meshes with an idler 104, which in turn meshes with a drive gear 105 rotatably mounted on a stud 106 secured in a boss 107 on the top of the dome 29. The gear 105 has a coupling 108 tightly fitted on its hub, to provide a connection to the usual input shaft of a register. The gears are enclosed by a cover 109, retained in position by screws 111 (see Fig. 1), which may be protected against unauthorized removal by a wire seal 112.

The shaft 75 is bored and counterbored to receive an adjusting rod 115, the lower end of which is threaded to extend through a tapped opening at the end of the shaft. At suitable spaced intervals, the rod 115 is grooved to receive resilient O-ring seals 116 to prevent leakage. The upper end of the rod is formed with a flat section 117 to receive a knurled knob 118 having a hexagonal projection 119, which normally fits into a socket 121 in the end of the shaft 75. The transverse section of the socket 121 is that of a dodecagon, and hence, when the knob 118 is withdrawn from the socket, it may be rotated through an arc of thirty degrees or any whole multiple thereof, and be readily replaced. By using a standard fine thread on the lower end of the rod, it will be seen that the rod 115 may be adjusted axially of the shaft 75 in very small increments. After proper adjustment has been made, the knob 118 may be secured against unauthorized manipulation by a sealing wire 122 (Figs. 1 and 3) threaded through holes 123 and 124 respectively drilled in the knob and rod 115.

Each of the piston rods 77 and 78 is connected to the inner face of its associated piston by means of an angular flange 131 which is tapped to receive screws 132 accessible from the head end (see Fig. 4). As best shown in Figs. 3 and 6, each rod is formed from flat stock with a yoke section 133 which is punched to provide a yoke 134. A slide 135, formed with a cylindrical end 136, extends into the bore of the aligned guide barrel 25 or 26, the end of which is closed by a plug 137. The end 136 is of smaller diameter than the bore to forestall any dashpot effect which would render the operation sluggish. As best shown in the enlarged illustration of Fig. 13, the rods 77 and 78 are interconnected at their yoke sections by a cylindrical crosshead 138 having an annular flange 139 at its upper end, which rests on the top of the rod 77, and a groove at its lower end to receive a snap ring 141 retaining a washer 142 against the rod 78. The crosshead 138 is encircled by rollers 140 which engage the yokes 134 with a loose fit.

The crosshead 138 is connected to the crank arm 76 by means best shown in the detailed views of Figs. 7, 13, and 14. The crank arm 76 is formed with a counterweighted split hub 143 formed with bosses 144 which are drilled and tapped to receive a machine screw 145 for clamping the hub onto the end of the shaft 75 against the thrust washer 94. The hub is also tapped to receive a set screw 146 which retains an aligning pin 147, entering a hole 148 in the shaft 75, to facilitate correct timing upon assembly. The opposite end of the arm 76 is drilled and tapped to receive retaining pins 149 and a screw 151, which secure a slightly flexible leaf 152 to the under side of the arm 76. The leaf 152 projects toward the hub end of the arm 76, to underlie a hole 153 drilled in the midportion of the arm, and to abut the end of the adjustment rod 115. A crank pin 154 passes through the leaf beneath the hole 153, and it is secured by means of nuts 156, to extend in the bore of the crosshead 138. The pin 154 carries an ellipsoidal roller 157 which fits within the crosshead 138. A coiled spring 158 is interposed between the leaf 152 and the crosshead flange 139, thereby keeping the crosshead 138 true with respect to the pistons, which aids in maintaining uniform accuracy.

It will be seen that, as the rod 115 is moved toward or away from the end of the leaf 152, the axes of the crank pin 154 and roller 157 will assume varying inclinations to the perpendicular, and, with respect to the axis of the shaft 75, increase or decrease the effective throw of the crank arm, and hence the linear displacement of the pistons 79 and 81 This calibrating mechanism is accordingly utilized to vary the volume of liquid displaced by the pistons on each stroke, and thus assure that the indications of the register will accurately reflect the delivered volume of gasoline. As indicative of the sensitivity of the present calibrating mechanism, and the accuracy of the meter as a whole, it may be noted that a variation of the effective crank throw of only 0.0006 inch is sufficient to change the volume one cubic inch in five U. S. gallons, and that the mechanism as illustrated has a sufficient range of adjustment to effect an over-all change of sixty cubic inches in five gallons. The meter may be readily adjusted to deliver five U. S. gallons, standard can test, plus or minus 0.5 cubic inch, which of course is well within the permissible deviation of plus or minus 3.5 cubic inches for new equipment.

As previously noted, flow through the meter is controlled by the rotary valve 82, positioned on the shaft 75 to bear against the upper side of the valve seat 43. The valve is a generally cup shaped member, provided with an eccentrically located and somewhat elongated bored boss 161 contiguous with the inner wall, which fits around the shaft 75. As best shown in Figs. 7 and 10, the inner wall of the valve is formed with a recess 162 into which extends a driving and aligning pin 163, projecting from a hole 164 in the shaft. The lower surface 165 of the valve is finished smooth and true, and it merges into the inner compartment 166 through an irregular curve whose arc of maximum radius 167 from the shaft axis lies near the periphery, and subtends an angle somewhat greater than that of the arcuate ports of the valve seat 43.

It will also be noted, either from Fig. 5 or the superimposition of Fig. 12 on Fig. 11, that the arc 167 is of such radius as to overlie the several ports 48, 49, and 51 as the valve element 82 is rotated, and it may, on occasion, uncover only one of these ports, as shown in Fig. 5, or uncover two ports, as will be readily apparent from inspection of this figure. Thus, liquid may flow from the head end of one, or both cylinders 64 and 65, or from one cylinder and the crankcase, or from the crankcase alone, to the outlet line 54, through the ducts previously described, but flow cannot take place in this manner from all three simultaneously.

The exterior surface of the valve 82 is formed with a pair of outwardly radiating wings 168 and 169, the tips of which are circumferentially spaced to subtend an open space or port 171, which is also of such radius and arcuate length as to overlie one or two, but not all three, of the ports in the valve seat 43, depending upon the instantaneous position. Liquid may therefore flow to either cylinder head, or the crankcase, or to one head and the crankcase, through the inlet ducts and passageways. The arcs 167 and 171 are of substantially the same length and radius, and they are symmetrical with respect to a common diameter.

The valve 82 is subjected to inlet pressure on its outer surface, and to outlet pressure within the compartment 166. The pressure differential, exerted on the larger outer surface, would normally tend to press the valve on its graphite seat 43 so tightly as to produce undue friction and resulting wear. Provision is therefore made to counterbalance a part of this force, and reduce the loading to a value which retains the valve on its seat with a minimum of friction consistent with a fluid-tight joint.

The means for this purpose, as best shown in Fig. 7, comprises a pressure plate or "umbrella" 173, which is eccentrically drilled to fit on the shaft 75 and around an O-ring seal 174 which prevents leakage, and also frictionally retains the plate from free upward sliding movement. The plate is slightly spaced from the valve 82 by a snap ring 175. The periphery of the plate is frusto-conical, and it retains an O-ring 176 against the top of the valve 82 to form a fluid-tight seal. A pin 177, press fitted in the plate 173, enters an oversized hole 178 drilled in the valve 82, and serves as a locating dowel. The plate 173 is so located above the valve 82 as to overlie substantially the eccentric area bounding the compartment 166.

It will now be seen that outlet pressure acting upwardly in the compartment 166 is substantially counterbalanced at all times, as the same pressure is transmitted to the space between the valve 82 and plate 173 through the hole 178. The same pressure acts on the under side of the plate 173, while the higher inlet pressure acts on the top of the plate. However, the plate cannot be forced down by the excess exterior pressure, as the snap ring 175 serves as a positive stop, and nullifies any effect that this pressure differential might otherwise have. The residual effective pressure on the valve 82 is thus reduced to the inlet pressure acting on the limited area of the peripheral portion of the valve, which is adequate to prevent leakage and withal permit smooth operation.

The coaction of the valve 82 and the pistons 79 and 81 will be described primarily with reference to Figs. 5 and 6, and the motion diagram of Fig. 15. Clockwise rotation will be assumed. It has been made apparent that the drive between the pistons and shaft 75 is the well known Scotch yoke type, in which the orbital motion of the crank pin causes reciprocation of the crosshead in the yoke, and concurrent reciprocation of the pistons. In the instant case, of course, the pistons do the actual driving, but the relative motions are the same as in a pump in which the shaft 75 is a power input shaft. The previously noted looseness of fit between the pin, crosshead, and yoke is to enable the shaft 75 to be rotated by one of the pistons 79 or 81, during a slight time interval or dwell when the other piston is about to reverse direction, and may be momentarily hydraulically locked.

As viewed in Figs. 3 and 6, piston 81 is at the inner end of its stroke, the axis of the crank arm 76 coinciding with the longitudinal axis of the piston and its rod. The ensuing movement of the piston 81 will be toward the head end of cylinder 65, and this direction of motion will arbitrarily be designated as positive. As piston 81 begins its motion, the piston 79 also moves toward the head end of its cylinder 64, and will not reverse its direction until the crank pin has advanced sixty degrees. Piston 81 may therefore be regarded as leading pison 79 by 120°, which of course is consistent with the inclination of the cylinders to each other.

The reciprocatory motion of a piston coacting with a rotary shaft through a Scotch yoke is substantially harmonic, and therefore instantaneous velocities of the pistons 79 and 81 toward and away from the head ends may be represented by the two sine curves in Fig. 15. The scale of the drawing is too small to attempt to indicate the variations from true harmonic motion incident to the above noted dwell periods at the ends of the strokes. Inasmuch as piston 81 is about to start toward the head end, this has been chosen as the zero or starting point in developing the curves. It will be seen that, for the initial movement of 60°, the pistons move in the same direction, toward the head end, and in the interval between 180° and 240°, they again move in the same direction, toward the crankcase end, but with respectively increasing and decreasing velocities. For the two other 120° intervals, their motions are in opposite directions.

The two areas above the curves are developments of the valve 82 and seat 45. Referring to Fig. 5, it will be noted that the inlet port 171 has just been cut off from port 49 leading to the head end of cylinder 65, and therefore piston 81 has reached the end of its stroke toward the crankcase 71. The discharge port 167 of the valve 82 is about to register with the port 49, thereby permitting the liquid in the cylinder 65 to flow to the well 53 and outlet duct 54. For the purposes of discussion, numerical values may be assigned to the various ports as follows: Fixed ports 48, 49, and 51 of valve seat 43 subtend arcs of 78°, and are uniformly spaced 42°. Rotary ports 167 and 171 subtend arcs of 98°, and are spaced 82°. The fixed ports may therefore be cut off from either of the rotary ports for 4°, which is the dwell period.

Taking the instantaneous position of Figs. 5 and 6 as a reference, it will be seen that port 167 is still open to port 51, to discharge liquid from the head end of cylinder 64, and that port 171 is open to port 48, to admit liquid to the crank case 71, and thus provide the driving force to move the pistons toward their head ends. When outlet port 167 opens to port 49, liquid will flow from the head end of cylinder 65 through 98°+78°, or 176°, which, with the four degrees lap, equals 180°, or a half cycle of revolution. At the same reference moment, the trailing edge of port 171 is 42° away from the edge of crankcase port 48, and thus liquid has been admitted to the crankcase for the preceding 56°. This admission will continue until the trailing edge of port 171 cuts off from port 48, which is (78°−56°+98°) or 120°, and thus admission to the crankcase extends continuously for the same angle of 176°. Similarly, port 51 has been open to discharge for 120°, and will continue so for an additional 56°, when the piston 79 will reach the end of its positive stroke.

It is believed unnecessary to repeat these values for other positions of the valve and pistons, as it is now apparent that the crankcase and adjacent ends of the two pistons 79 and 81 coact jointly to perform the function of a third piston and cylinder displaced 120° from the other two. In addition to the savings obtained by elimination of structure, it may be noted that a smoother flow rate or diminution of pulsation may be obtained, as compared, for example, to a double acting two cylinder or single acting four cylinder meter. Thus, the latter has a variation of about 32% from the average displacement rate or velocity, whereas the meter of the present invention has a variation of only 14%.

The employment of the Scotch yoke drive, and the balancing of the valve 82, also contribute to smooth operation. The disposition of the cylinder portions at an angle to the crankcase portion 22 also leads to reduction in size, which is highly desirable in view of the somewhat over-crowded condition of modern gasoline pump cabinets. It has already been noted that the calibrating means is readily accessible from the exterior of the meter, and may be operated to bring the unit into very close adjustment.

While the invention has been described with respect to a single embodiment, and specific numerical values have been given to facilitate explanation, it will be understood that it is not intended to limit the invention thereto.

Thus, while the present meter is shown as having only two cylinders, multiples of two may be employed, with the angle between them equal to the number of cylinders plus one, divided into 360°. Similarly, the leaf 152 may be made bimetallic, to provide for automatic temperature compensation, when the service conditions warrant such refinement. Other modifications will readily suggest themselves to those skilled in the art, and therefore it is intended to cover all variations which fall within the scope of the following claims.

I claim:

1. A piston-in-cylinder flow meter comprising a body having a crankcase portion and cylinder portions, a shaft extending into the interior of the crankcase portion, pistons mounted in the cylinder portions and provided with rods extending into the crankcase portion, a crank arm connected to the inner end of the shaft, a leaf connected to the crank arm, a crank pin mounted on the leaf, a driving connection between the pin and the piston rods, an adjusting rod extending through the shaft and provided with a threaded portion bearing therein, the inner end of the rod engaging the leaf whereby upon turning the rod the flexure of the leaf and the effective distance of the crank pin from the shaft axis are varied, thereby changing the displacement of the pistons.

2. A liquid flow meter comprising a plurality of cylinders and pistons slidably mounted therein, a crankcase, piston rods formed with yokes extending into the crankcase, a shaft extending into the crankcase, a crank arm connected to the shaft and having a leaf secured thereto at the end thereof, a crank pin mounted on the leaf between the secured end and the axis of the shaft, a crosshead mounted in the piston rod yokes and receiving the crank pin, the connection between the yokes, crosshead and crank pin, including limited clearance, an adjusting rod extending through the shaft, said rod and shaft having engaging screw thread and nut portions whereby the rod may be moved axially of the shaft, the end of the rod engaging the leaf to alter the flexure thereof and the effective throw of the crank arm as the rod is adjusted.

3. A liquid flow meter as set forth in claim 2, including a body through which one end of the shaft extends, said one end being formed with a socket of polygonal section, the end of the rod projecting through the socket having an axially movable nut thereon also of polygonal section and adapted to seat in the socket.

References Cited in the file of this patent
UNITED STATES PATENTS

| | | |
|---|---|---|
| 1,112,233 | Stevens | Sept. 29, 1914 |
| 1,148,425 | Adams | July 27, 1915 |
| 1,560,492 | Powell | Nov. 3, 1925 |
| 2,091,912 | De Lancey | Aug. 31, 1937 |
| 2,106,651 | Parker | Jan. 25, 1938 |
| 2,121,120 | De Lancey | June 21, 1938 |
| 2,413,034 | De Lancey | Dec. 24, 1946 |
| 2,435,611 | Sejarto | Feb. 10, 1948 |

FOREIGN PATENTS

| | | |
|---|---|---|
| 28,999 | Australia | Sept. 15, 1930 |
| 102,353 | Great Britain | Nov. 30, 1916 |
| 393,916 | Great Britain | June 15, 1933 |